US005385785A

United States Patent [19]

Lovell

[11] Patent Number: 5,385,785

[45] Date of Patent: Jan. 31, 1995

[54] APPARATUS AND METHOD FOR PROVIDING HIGH TEMPERATURE CONDUCTIVE-RESISTANT COATING, MEDIUM AND ARTICLES

[75] Inventor: Walter C. Lovell, Wilbraham, Mass.

[73] Assignee: Tapeswitch Corporation of America, Farmingdale, N.Y.

[21] Appl. No.: 113,391

[22] Filed: Aug. 27, 1993

[51] Int. Cl.⁶ .................... B32B 9/00

[52] U.S. Cl. .................... 428/408; 338/308; 219/542; 428/901

[58] Field of Search .................... 338/308; 219/542; 252/506; 428/901, 408

[56] References Cited

U.S. PATENT DOCUMENTS

| | | | |
|---|---|---|---|
| 3,248,237 | 4/1966 | Weldes et al. | 106/38.35 |
| 3,518,116 | 6/1970 | Stock et al. | 117/226 |
| 3,696,054 | 10/1972 | Saunders et al. | 252/511 |
| 4,346,277 | 8/1982 | Wojtecki | 219/542 |
| 4,656,339 | 4/1987 | Grise | 219/542 |
| 4,664,900 | 5/1987 | Miyazaki et al. | 423/447.3 |
| 4,877,554 | 10/1989 | Honma et al. | 252/511 |
| 5,111,178 | 5/1992 | Bosze | 338/226 |

*Primary Examiner*—Patrick J. Ryan
*Assistant Examiner*—Kam F. Lee
*Attorney, Agent, or Firm*—Hoffman & Baron

[57] ABSTRACT

The temperature adjustable coating and medium and method for providing an electrically-resistant temperature-adjustable article and structure. The coating provides a continuous electrically-conductive electrically-resistive path for the application of electrical current to the coating. The electrically-resistant temperature-adjustable article consists of a surface on which a high-temperature conductive-resistive coating is bound. The surface temperature of the article along the path is thereby adjustable between ambient and 2000° F. in response to electric current applied to it without oxidization destroying the electrical conductivity of the medium in temperatures above 600° F. The medium possesses the high-temperature conductive-resistive quality of the coating while maintaining a clay consistency capable of being formed into various shapes without a substrate.

19 Claims, 13 Drawing Sheets

APPARATUS AND METHOD FOR PROVIDING HIGH TEMPERATURE CONDUCTIVE-RESISTANT COATING, MEDIUM AND ARTICLES

BACKGROUND OF THE INVENTION

The present invention relates to temperature-producing conductive-resistive coating and medium, and to a method of producing a variety of articles therefrom.

There have been many attempts to produce electrically-conductive coatings such as paints. Generally, there are two types of electrically-conductive coatings. The first is a low resistivity, high conductivity paint that contains a pigmentation of metal particles while the second is a high resistivity, low conductivity paint that is formed from compositions containing carbon or graphite that oxidize at temperatures above 600° F., and lose their electrically conductive ability.

Low resistivity paints have traditionally been used to provide coatings having high conductivity for connecting conductors that require a superior electrical bond with a minimum resistance. Generally, low resistivity paints cannot be applied to materials in order to produce temperature adjustable heating elements because the low resistivity paint requires a high volume of current to generate a reasonable output of heat. In contrast, the resistivity of traditional highly resistive paints is often so high that a relatively high voltage drop is required in order to generate sufficient heat. Also, the use of traditional high resistivity paints within highly elevated temperatures oxidize and lose electrical conductivity permanently. Furthermore, when either of the above-identified traditional conductive paints are applied to various substrates, cracks and flaking of the paint often develop over a period of time. Cracks and flaking of the paint coating may cause arcing and unequal power distribution sacrificing safety. Concomitantly, a breakdown in the temperature adjustable property of the coating may occur thereby causing an unequal heat distribution upon the surface of the article.

It is therefore an object of this invention to provide an electrically resistant temperature-adjustable conductive composition for application to a variety of substrates that can be formed into various shapes with structural integrity without a substrate to provide temperature control properties in a high temperature range without the non-continuous electrically conductive components oxidizing and losing conductivity in an oxygen atmosphere in temperatures above 600° F.

It is another object of the invention to provide an electrically resistant temperature-adjustable conductive composition for application to a variety of materials wherein a thin coat of the electrically-resistant temperature-adjustable conductive composition does not inhibit the inherent flexibility of a flexible substrate to which the composition is applied therefore maintaining the structural integrity of the substrate.

It is still another object of the invention to provide an electrically resistant-temperature-adjustable conductive composition which bonds well and is capable of maintaining its integrity at high temperature ranges as a coating or as a structural material.

Other and further objects will be made known to the artisan as a result of the present disclosure and it is intended to include all such objects which are realized as a result of the disclosed invention.

SUMMARY OF THE INVENTION

In accordance with one embodiment of the invention, a high-temperature conductive-resistive (HTCR) medium is provided which includes a substantially non-continuous electrically conductive component, such as graphite, suspended in a substantially non-conductive binder, such as an alkali-silicate compound. "High-temperature", as used in the present application, refers to temperatures within a relatively high temperature range of between about 400° F. to about 2000° F. The non-continuous electrically conductive component can be included in an amount of from 4–15 weight percent and the substantially non-conductive binder can be included in an amount of from 50–68 weight percent. These components can be combined with an amount of from 2–46 weight percent of water.

According to another embodiment of the invention, an electrically-resistant temperature-adjustable structure is provided comprised of a high-temperature conductive-resistive material. The material includes a substantially non-continuous electrically conductive component for providing a continuous electrically-resistive path for application of electrical current through the material. The HTCR material components are similar to and combined in amounts similar to those amounts used to form the above-described medium. In addition, by removing most of the water from the material mixture, the material is made into a thick clay-like material to form the structure, then air dried or kiln fired at over 2000° F. in a salt (NaCl) atmosphere.

According to yet another embodiment of the invention, an electrically-resistant temperature-adjustable article is provided comprising a high-temperature conductive-resistant coating on a surface of the article. The coating includes a substantially non-continuous electrically conductive component for providing a continuous electrically-resistive path for application of electrical current through the article surface. The HTCR coating components are similar to and combined in similar amounts as the above-described medium.

The conductive-resistive coating can be applied in thin coats to the surface of flexible substrates, such as fireproof paper, silica cloth, fiber glass cloth or flexible metal tapes without adversely affecting the flexibility of the substrate and without breaking down because of the flexible nature of the substrate. It may also be applied to the surface of any rigid high-temperature substrate such as rigid fiber glass panels of a variety of thicknesses and shapes, glass or ceramic material such as cookware, anodized aluminum or dielectric coated copper strip, wood, concrete or concrete-formed articles, brick or clay-like material to provide an electrically-resistant temperature-adjustable heating element capable of producing temperatures within a high temperature range of up to the degradation of the coated surface, or 1800° F. with an oxygen barrier coating such as ferric oxide ($Fe_2O_3$) mixed with sodium silicate ($Na_2SiO_3$) as a non-substrate structure.

In order to vary the temperature of the electrically-resistant temperature-adjustable medium, structure or heating element, an electric current is imposed on the medium, structure or coated substrate surface such as by spaced apart electrical conductors secured or imbedded in the substrate material. As a result, the conductive-resistive medium, structure or coating applied to the various substrates provides an electrical path between the conductors. The conductive path radiates heat as a result of resistive conductance between the conductors. The path can include a major portion of a medium, a major portion or the whole of a structure, and even substantially all of the surface of the article.

In order to impose an electric current upon the medium, structure or coated substrate surface, a power supply is attached to the spaced apart electrical conductors secured to the HTCR material. The power supply (which may be a battery) can be attached using electrical leads or attached indirectly using an electrical connector. An electrical connector can be connected to tab portions of the electrical conductors formed for that purpose.

The method of the invention for providing a electrically-resistant temperature-adjustable medium includes providing a high-temperature conductive-resistive material and applying an electrical current through the material to adjust the surface temperature of the medium.

The method of the invention for providing an electrically-resistant temperature-adjustable structure includes providing a high-temperature conductive-resistive material formed as any geometric shape and applying an electrical current through the structure to adjust its temperature.

The method of the invention for providing temperature-adjustment capability to a variety of substrates includes applying a conductive-resistive coating to any high temperature substrate. Examples of flexible high temperature substrates are fireproof paper, high temperature silica cloth, fiberglass cloth, or flexible metal tapes with dielectric coating. Examples of rigid substrate materials are rigid fiberglass panels of a variety of thicknesses and shapes, glass or ceramic material such as cookware, anodized aluminum or dielectric coated copper strip, wood, concrete or concrete-formed articles, brick, clay-like material, and forms shaped from the conductive resistant medium itself in the consistency of clay, dried and kiln fired at over 2000° F. An electrical current is then imposed across the coated substrate surface or through the formed shapes thereby elevating the temperature of the articles to a high temperature range. The method may also include applying a hydrophilic substance to any of the above-mentioned substrates before the conductive-resistive coating is applied.

As a result of the inventive HTCR composite, medium, structure, coating and methods of the invention, a high-temperature conductive-resistive (HTCR) based product is provided which does not crack or flake after repeated heating to high temperatures and subsequent cooling of the product. Additionally, the HTCR composites of the invention provide a high-temperature conductive-resistive medium, a high-temperature conductive-resistive structure and a thin, high-temperature conductive-resistive coating which will not inhibit the inherent flexibility of a flexible high-temperature substrate to which it is applied, such as fireproof paper, silica cloth, fiberglass cloth, or flexible metal tapes. The HTCR coating composition also can be applied to substrates such as rigid fiberglass panels of a variety of thicknesses and shapes, glass or ceramic material such as cookware, anodized aluminum or dielectric coated copper strips, wood, concrete or concrete-formed articles, brick or clay-like material and can be formed in various shapes that are conductive-resistive structures formed without substrates. Conductive resistant shapes and substrates can be heated to relatively high-temperatures without the danger of combustion.

A preferred form of the apparatus and method for providing high-temperature conductive-resistive composites, as well as other embodiments, objects, features and advantages of this invention will be apparent from the following detailed description of illustrative embodiments thereof, which is to be read in connection with the accompanying drawings.

DETAILED DESCRIPTION OF THE PREFERRED EMBODIMENT

Figure 1:
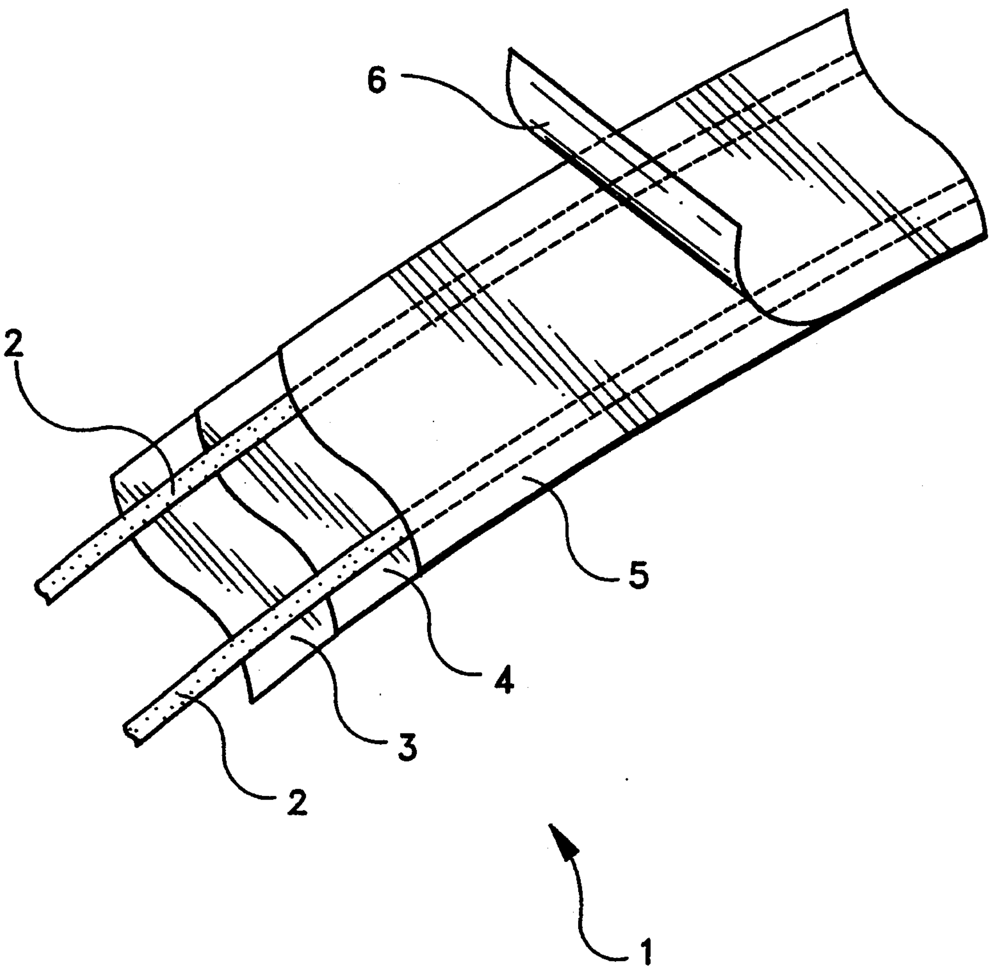
FIG. 1 is a top perspective view of a portion of flexible substrate material to which an HTCR coating of the present invention has been applied.

According to the present invention, a conductive-resistive medium which includes conductive powder suspended in a substantially non-conductive binder, such as an alkali-silicate compound, can be applied to and lastingly adhered to a variety of substrates or form various shapes without inhibiting the integrity of the medium or the inherent pliability of the substrate or structural shapes at high temperatures. "High-temperature" as used in the present application, refers to temperatures within a high temperature range of from ambient to approximately 2000° F.

The conductive powder in the most preferred embodiment is some form of graphite and/or tungsten carbide. The most preferred binder includes alkali-silicate compound containing sodium silicate, china clay, silica, carbon and/or iron oxide and water.

The HTCR medium preferably includes from 4 to 15 weight percent of graphite. A suitable, inexpensive and preferred form of graphite for use in this coating is a graphite bearing suppliers designator P38, which is 2% ash-200 mesh, and is manufactured by UCAR Carbon Co. of Parma, Ohio. However, other graphites substantially equivalent to that of the P38 graphite with 2% ash also may be used.

The preferred HTCR binder includes from 50 to 68 weight percent alkali-silicate compound. The alkali-silicate compound also includes approximately 0 to 14 weight percent china clay, 0 to 14 weight percent silica, of from 0 to 10 weight percent iron oxide as an oxygen barrier, and/or carbon, and approximately 38 weight percent sodium silicate or other silicate of alkali or alkali earth metals. The described weight percents of the alkali-silicate compound are weight percents of the entire HTCR compound. China clay, more or less identical to kaolin, is a commercial term for hydrated aluminum silicate. The term china clay is applied to relatively pure clay concentrated by washing from a thoroughly kaolinized granite; silica is a powdered form of quartz.

The binder can be used to vary the electrical properties of the medium, e.g., conductivity and resistance. A portion of the graphite within the alkali-silicate compound may be replaced by iron oxide. By replacing graphite with iron oxide, the resistance of the coating is increased thereby increasing its heating capacity and the oxygen barrier to protect the graphite from losing conductivity. Finally, water is combined with the graphite and alkali-silicate in an amount sufficient to provide from 2 to 40 weight percent of the overall composition.

A higher percentage of water is used for preparing an HTCR medium composite and even higher percentages of water for producing an HTCR coating composite. A reduced percentage of water is used for applications where the HTCR composite exhibits a clay consistency and is used to form products without the use of substrate materials.

EXAMPLE 1

An HTCR coating according to the present invention was produced in the following manner. Graphite powder and water were measured in a predetermined weight ratio and mixed thoroughly in order to obtain a uniform consistency. The resultant conductive mixture was combined with a suitable amount of the alkali-silicate compound, i.e., the mixture of sodium silicate, china clay and carbon to produce a uniform consistency.

EXAMPLE 2

An HTCR coating according to the present invention having a higher resistivity than the coating produced by the method of Example 1 was produced in the following manner. Graphite powder and water were mixed as described above. The resultant mixture was then combined with an alkali-silicate compound wherein suitable weighted amounts of iron oxide were combined with the sodium silicate and china clay in lieu of some part of the graphite. The resulting coating displayed a higher resistivity than that coating produced by the method of Example 1.

EXAMPLE 3

Flexible high-temperature HTCR coated articles of the present invention were produced in the following manner. Conductive perforated serpentine-shaped strips in the form of spaced apart electrical conductors were first attached to a portion of the flexible substrate surface, using an iron oxide/sodium silicate adhesive mixture, spaced to determine desired resistance. The perforated serpentine-shaped electrical conductors were formed as relatively thin strips in order to avoid inhibiting the inherent flexibility of the substrate. Once the electrical conductors were attached to the substrate surface, the HTCR coating was applied to both the surface and the electrical conductors using a power sprayer which provided a relatively thin, even application. Because of the perforations, the material flows through the electrical conductors, increasing the strength of the bond and the electrical contact between the conductor and HTCR coating. The serpentine shape increases the physical strength of the adhesive bond between the conductors and the HTCR composite thereby minimizing fracturing. Fracturing can occur when the composite is heated due to differences in the coefficients of expansion of the composite and conductor material.

Once applied, the HTCR coating was permitted to dry naturally. When dried, a second flexible high-temperature substrate was secured to the HTCR coated surface using a mixture of iron oxide and sodium silicate. Therefore, a high-temperature adjustable article displaying an appearance of the attached substrate was created. The article bore no indication of the HTCR coating or attached electrical conductors and was capable of maintaining its integrity within the high-temperature range of from ambient to approximately the melt or deterioration temperature of the substrate. The following products were prepared in accordance with the procedure of Example 3.

Referring to FIG. 1 of the drawings, a flexible high-temperature conductive-resistant (HTCR) coated article 1 is shown. Article 1 is a flexible substrate material to which a thin HTCR coating of the present invention has been applied. The following description is applicable to any one of a variety of flexible high-temperature substrate materials. Examples of flexible high-temperature materials include fireproof paper, fiberglass cloth, flexible silica heating cloth, flexible metal dielectric coated tape and the like. Such materials can be used as floor coverings, coverings for vessels, heated wall covers, heated floorpads, hot wraps for unfreezing frozen blockages within pipes, etc.

FIG. 1 shows perforated conductive strips 2 in the form of spaced-apart electrical conductors attached to a portion of a substrate surface 3 of the flexible substrate material (article 1). Strips of perforated copper foil as well as many other types of conductive material can be used as electrical conductors. It must be noted however, that if the coated article 1 is a metal heating tape or some similarly conductive non-anodized substrate material, a non-conductive coating 4 should be applied between the substrate surface 3 and the perforated conductive strips 2 to avoid short circuits. For flexible substrates, the electrical conductors are preferably formed in relatively thin perforated strips in order to avoid inhibiting the inherent flexibility of the substrate.

The electrical conductors can be secured to flexible substrate 3 in any manner deemed appropriate to a person skilled in the art. Graphite/sodium silicate conductive paste, has been demonstrated as being capable of adequately securing the thin strips of perforated copper foil (conductive strips 2) to the flexible high-temperature substrate 3 and maintaining the integrity of its bond at elevated temperatures.

Once the perforated conductive strips 2 have been secured to the substrate 3, a high-temperature conductive-resistant (HTCR) coating 5 is applied to the substrate surface 3 (or non-conductive coated surface 4) and to the spaced-apart perforated conductive strips 2 adhered thereto. The spacing between the perforated conductive strips 2 and the resistance of the HTCR coating determines the amount of heat and therefore the temperature when a voltage source is applied.

The HTCR coating 5 can be applied by any of the known means of application such as by brush or power sprayer. A relatively thin, even application of the HTCR coating 5 is applied to the substrate/conductive strip combination, although thicker coatings may also work. However, thicker coatings are usually less desirable for application to flexible substrates because they are less flexible. The HTCR coating 5 can be permitted to dry naturally or the drying process can be accelerated by heating and circulating air thereover. The HTCR coating 5 is capable of safely heating flexible high-temperature substrates to just below their melting point or deterioration before experiencing deleterious effects.

At times it is desired than an HTCR coated article or substrate not outwardly display the appearance of a HTCR coated heat producing article. In such an application, a second flexible high-temperature substrate 6, such as the flexible metal tape shown in FIG. 1, may be adhered to the HTCR coated surface 5 rendering the appearance of the article 1 more aesthetically pleasing. This is achieved by securing the second flexible high-temperature substrate 6 upon the portion of the first flexible high-temperature substrate 3 upon which spaced-apart electrical conductors (perforated conductive strips 2) and HTCR coating 5 are disposed. The second flexible substrate 6 preferably comprises the same or a similar flexible high-temperature material and a substantially similar shape as that of the first substrate 3. The flexible second substrate 6 is preferably secured to the first substrate 3 after the HTCR coating 5 has dried.

The flexible second substrate 6 is preferably attached to the HTCR coating 5 using an appropriate adhesive which is compatible with operating temperature of the article. After the flexible second substrate 6 has been adhered to the HTCR coating 5 of first substrate 3, the HTCR coated article 1 preferably will appear as a continuous flexible substrate similar to one which does not have the HTCR composite of the invention.

Figure 1A:
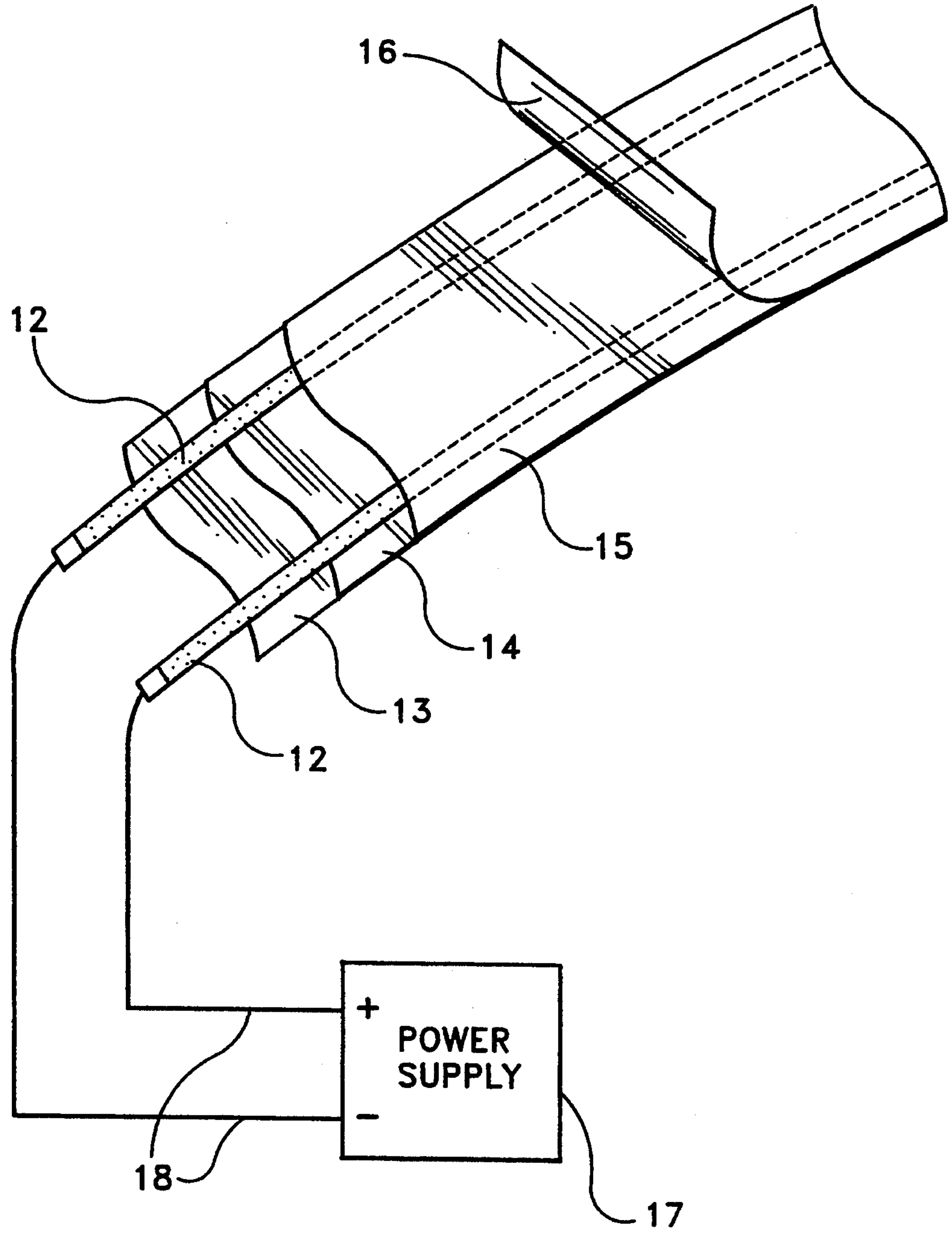
FIG. 1A is a top perspective view of a portion of flexible substrate material of the invention to which an electrical power supply has been attached.

FIG. 1A depicts a flexible substrate having an HTCR coating of the invention to which a power supply 17 is attached. The power supply 17 is connected to perforated conductive strips 12 through electrical leads 18. Power supply 17 may be any conventional power supply or an electrical storage cell.

A non-conductive coating 14 is shown applied between the substrate surface 13 and perforated conductive strips 12 to avoid short circuits as in the embodiment described in relation to FIG. 1. In addition, a second flexible substrate 16 may be attached to the HTCR coating 15 using an appropriate adhesive whereby the HTCR coating 15 and strips 12 are not readily apparent.

Figure 2:
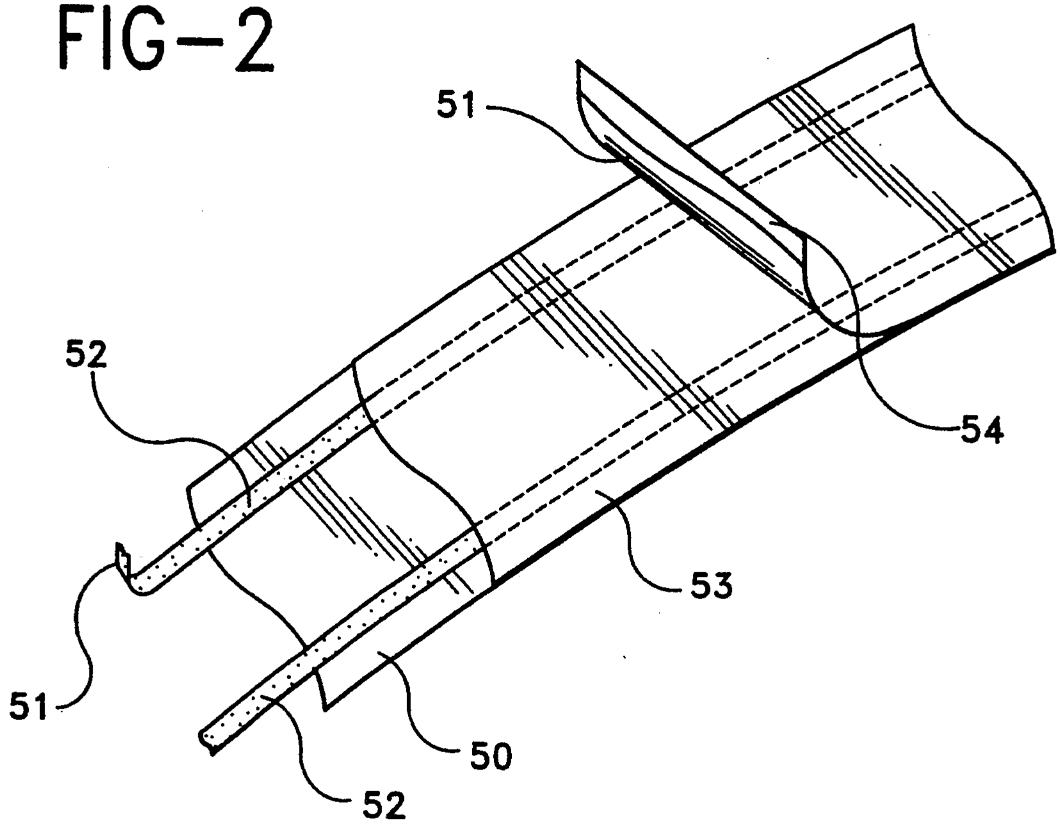
FIG. 2 is a top perspective view of a portion of HTCR coated flexible substrate material in which electrical conductors are adhered to the substrate with a high-temperature adhesive.

An alternative embodiment of the invention is shown in FIG. 2 wherein adhesive 51 is applied to the bottom of each of a pair of perforated conductive strips 52 so that each strip can be secured to a flexible substrate 50. Thereafter, an HTCR coating 53 is applied to the combination of the perforated conductive strips 52 and the flexible substrate 50. A coating of adhesive 51 also is applied to the underside of a second flexible substrate 54 so that it can be secured to the HTCR coating 53 on the surface of substrate 50.

Figure 3:
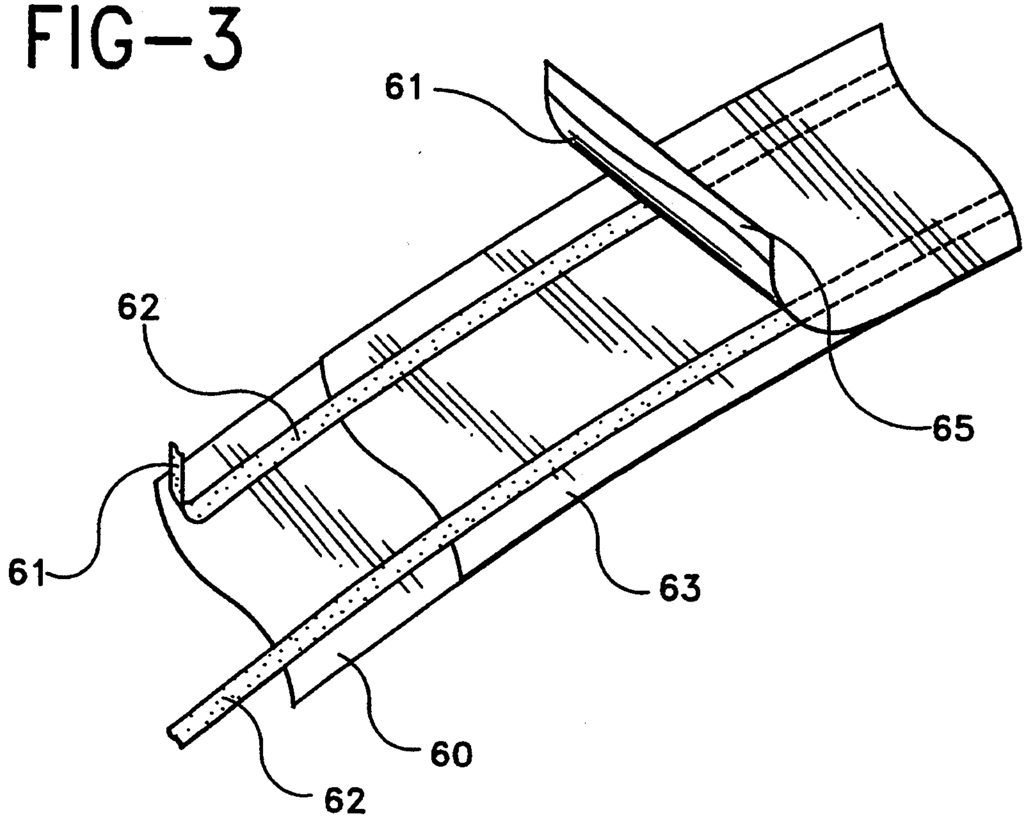
FIG. 3 is a top perspective view of a portion of HTCR coated flexible substrate material in which electrical conductors are adhered to the substrate with a high-temperature conductive adhesive.

Another embodiment of the invention is illustrated in FIG. 3 showing a flexible substrate 60 upon which an HTCR coating 63 of the invention is applied and allowed to dry. Then, a non-conductive adhesive 61 of graphite/sodium silicate is applied to the underside of each of a pair of perforated conductive strips 62 before they are positioned upon the HTCR coating 63. Conductive adhesive 61 consists of a mixture of approximately 60–80 weight percent of sodium silicate and approximately 20–40 weight percent of graphite or tungsten carbide. A second flexible high-temperature substrate 65 may then be secured to the combination of the first substrate 60, perforated conductive strips 62 and HTCR coating 63 as described with regard to the FIG. 2 embodiment.

Figure 4:
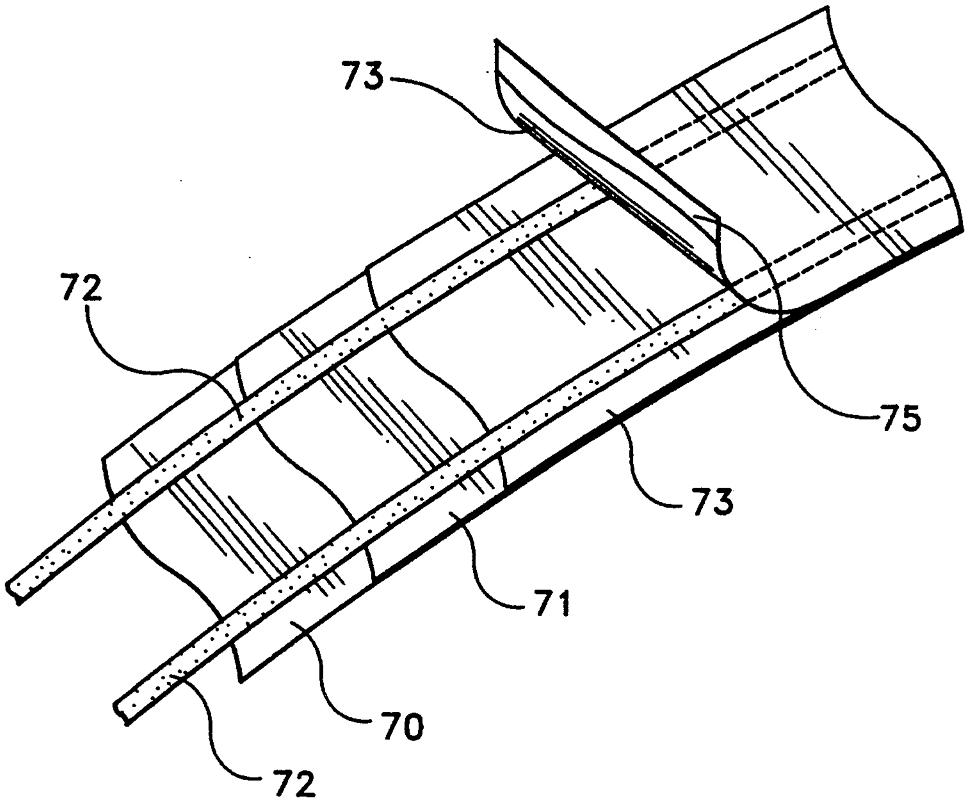
FIG. 4 is a top perspective view of a portion of HTCR coated flexible substrate material in which a substrate has been adhered with an HTCR coating.

An alternative embodiment of the invention is shown in FIG. 4 depicting a flexible substrate 70 upon which an HTCR coating 73 of the invention is applied. Perforated conductive strips 72 are laid upon the HTCR coating 73 before the HTCR coating 73 dries so that when the coating dries, the perforated conductive strips 72 will be secured to the substrate 70. Thereafter, HTCR coating 73 is applied to the underside of a second substrate 75. Before the HTCR coating 73 has dried upon second substrate 75, it is laid upon the side of flexible high-temperature substrate 70 having the perforated conductive strips 72 and HTCR coating 73 applied thereto. In this manner, the second flexible substrate 75 is adhered to the first flexible substrate 70 with perforated conductive strips 72.

The method of the present invention enables the artisan to select a flexible high-temperature article of any desired shape. The substrate is preferably hydrophilic in nature, however, non-hydrophilic materials may also be used. If the substrate (be it flexible or non flexible) is non-hydrophilic, the substrate may be treated with a hydrophilic substance 71, e.g., polyvinylpyrrolidone (PVP). The hydrophilic substance 71 is applied to the non-hydrophilic substrate 70 so that the substrate will have an affinity for water and water-base products which are applied thereto. Since the HTCR coating 73 preferably has a water-base, it is preferable that the substrate be hydrophilic in nature or that a hydrophilic substance be applied.

Figure 5:
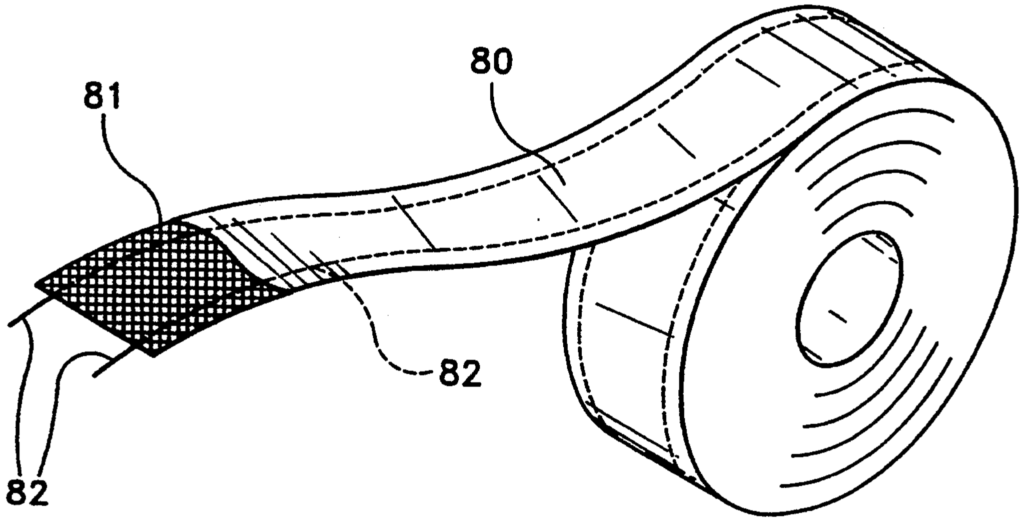
FIG. 5 is a perspective view of a roll of fiberglass cloth upon which an HTCR coating of the invention has been applied.

In the embodiment depicted in FIG. 5, conductive wires 82 in the form of spaced-apart electrical conductors are attached to a flexible high-temperature fiberglass cloth substrate 81. A variety of wire such as copper, aluminum or the like may be sewn into the substrate 81 material. The wire, type and gage are determined by the current and flexibility requirements of the end application. The HTCR coating 80 of the invention is applied to the fiberglass cloth substrate 81. The convenience of having such a roll of a flexible fiberglass or silica cloth is that it can be easily wrapped around a second article or material of any shape to which heat may then be transferred.

The HTCR conductive-resistant medium of the present invention may be also applied to rigid high-temperature materials, and be used to form conductive-resistant materials without substrates. A non-limiting list of non-flexible substrates includes fiberglass panels, glass or ceramic materials, such as cookware, anodized aluminum or dielectric copper strips, wood, concrete or concrete-formed material, and brick or clay-like material. These materials should be capable of being heated to relatively high temperatures without the danger of combustion. Several examples of non-flexible HTCR articles are, but not limited to, cooking surfaces, drying ovens, heated walls for cooking ovens or dishwashers, heating and drying elements, heating strips for baseboard units, heat circulating fans, defrosting surfaces, crank case pans, air ducts, transport trucks, wall panels, roof flashing, heating pipes, etc.

EXAMPLE 4

A non-flexible high-temperature HTCR coated article of the present invention was produced in the following manner. Using a paint brush, an HTCR coating of the present invention was applied to a non-flexible substrate. Next, rigid electrically conductive strips, perforated (perforated serpentine-shaped conductive strips may also be used) and thicker than those used in Example 3, were attached to the coated surface using a graphite/sodium silicate adhesive mixture. Finally, a non-conductive protective coating of iron oxide/sodium silicate was then applied to the HTCR coating in order to electrically isolate the coated surface to prevent shorting with objects contacting it. In this manner, a non-flexible HTCR coated article was formed. When tested, this HTCR coated article radiated sufficient amounts of heat to produce wide temperature ranges within the range of from ambient to 1200° F. The following products were prepared as in Example 4.

Figure 6:
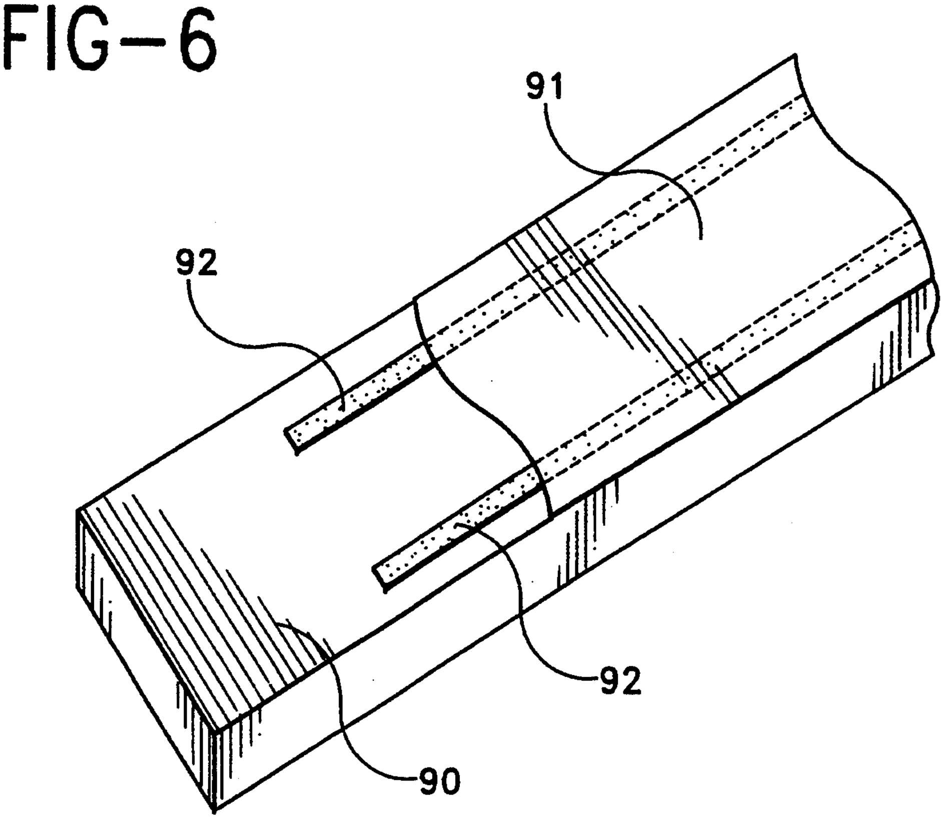
FIG. 6 is a perspective view of a section of non-flexible ceramic floor tile upon which an HTCR coating of the invention has been applied.

Referring to FIG. 6, an HTCR coated article is shown wherein a substrate 90 is a section of non-flexible ceramic floor tile. Attached to the ceramic floor tile are spaced-apart electrical conductors 92. Since the ceramic floor tile 90 is non-flexible, it is not necessary to use thin, flexible electrical conductors and therefore thicker, rigid conductive strips can be implemented. Electrical conductors 92 may be secured to the ceramic tile using any known means, including conductive glazing. Thereafter, HTCR coating 91 is applied to the surface of the tile 90 and to conductors 92 which have been secured thereto. It should be noted that the present invention will operate without having the electrical conductors 92 secured to the substrate or ceramic tile 90 directly. However, in order to be able to radiate sufficient amounts of heat and in order to produce wide temperature ranges, it is preferred to secure the strips of spaced-apart electrical conductors 92, as previously described.

Figure 7:
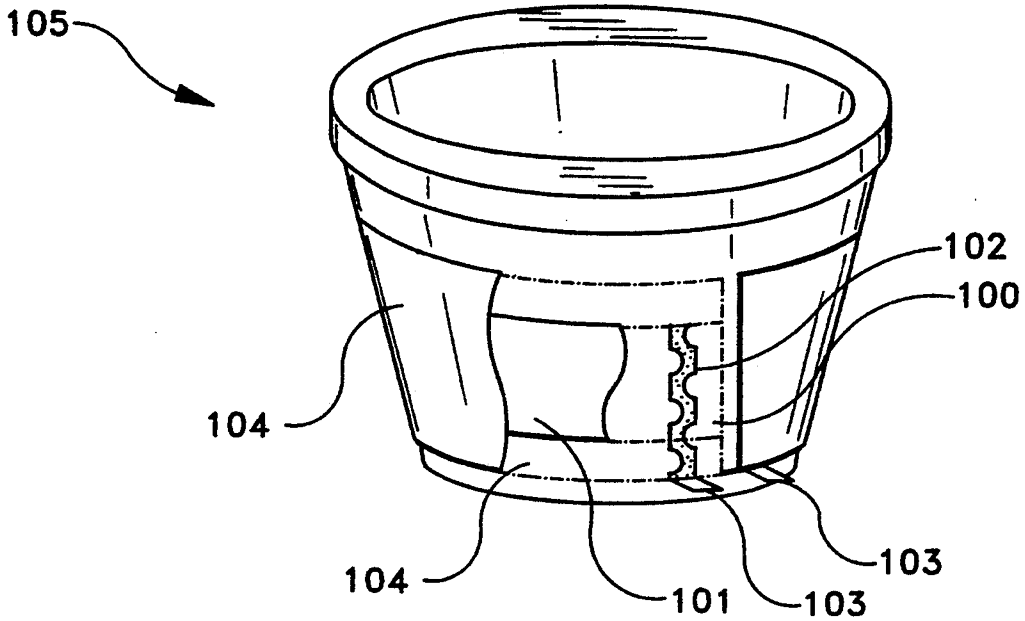
FIG. 7 is a perspective view of an article of pottery upon which an HTCR coating of the invention has been applied.

An alternative embodiment of the invention is shown in FIG. 7. There, an HTCR coating 101 is applied directly to an article of pottery 105 as depicted. Perforated serpentine-shaped conductive strips 102 in the form of spaced-apart, parallel electrical conductors are attached to the outer cylindrical substrate surface 100. The length of the perforated serpentine-shaped conductive strips 102 extend along the cylindrical height for some portion thereof, determining the conducting coating surface area 101 and therefore the heating capacity of the pottery article. Voltage applied to the perforated serpentine-shaped conductive strips 102 creates a potential across the larger HTCR coated pottery surface 101 between the strips, i.e., almost the entire circumferential surface of the pottery article.

The perforated serpentine-shaped conductive strips 102 can be secured to the substrate surface 100 in any manner deemed appropriate to a person skilled in the art. However, a graphite/sodium silicate adhesive has been demonstrated as being capable of adequately securing the thin strips of the perforated serpentine-shaped copper foil to a pottery article which must operate with a temperature range of from ambient to 1200° F. The conductive strips 102 are perforated and serpentine shaped to provide a larger surface area in conducting contact with the HTCR coat 101. This provides for a firm contact to minimize fracturing due to the differing coefficients of expansion of the two materials as the temperature is increased. In addition, connector tab portions 103 are formed at the ends of perforated serpentine-shaped conductive strips 102. The tab portions 103 do not directly electrically contact substrate 100. A power connector (not shown) for applying a voltage across the conductive coating 101 through perforated serpentine-shaped conductive strips 102 is attached to the connector tab portions 103.

Once the perforated serpentine-shaped conductive strips 102 have been secured to substrate 100, HTCR coating 101 is applied to the substrate surface 100 and the spaced-apart parallel conductive strips 102 adhered thereto. Because of the non-coated non-conducting space between the conductive strips 102, current flows only annularly along the outer coated cylindrical surface 101 of the pottery between the strips. A non-conductive outer coating 104 is applied to the HTCR coating 101 covering the outer surface of the pottery. Non-conductive outer coating 101 is provided as a safety feature. It prevents short circuiting of the voltage applied across the conductive coating 101 with articles coming into contact with the pottery.

Figure 8:
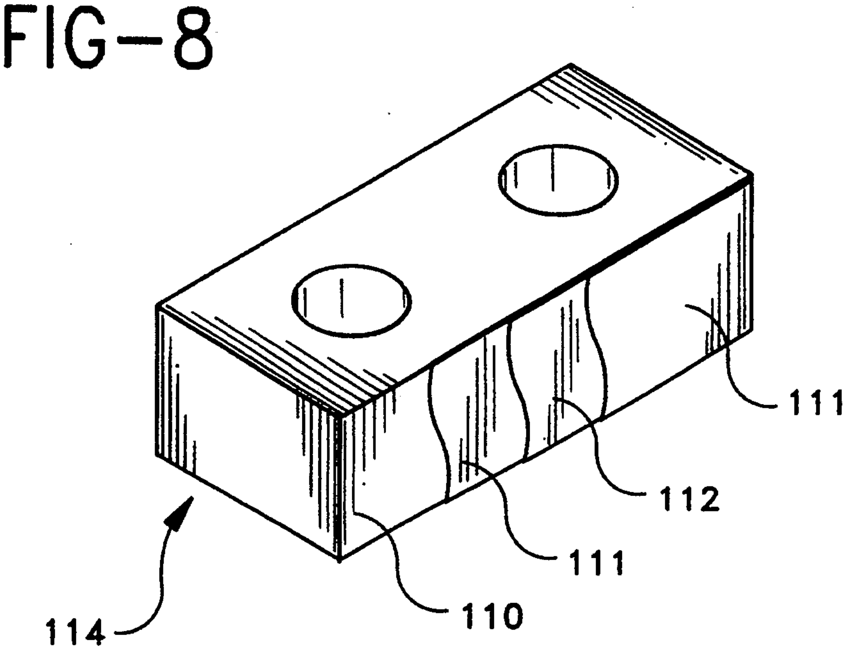
FIG. 8 is a perspective view of a clay or concrete brick upon which an HTCR coating of the invention has been applied.

In the embodiment depicted in FIG. 8, a brick 114 is shown with an HTCR coating of the invention applied. First, a non-conductive silica-clay coating 111 is applied to brick surface 110. An HTCR coating 112 is then applied to the silica-clay coating 111. Electrodes (not shown) may be attached either to the non-conductive silica-clay coat 111 before the HTCR application or to the HTCR coating 112 directly. A second silica-clay coating 111 is then applied over the conductors and the HTCR coated surface 112. This prevents short circuiting of the voltage applied across the coating with objects coming into contact with the brick.

Figure 9:
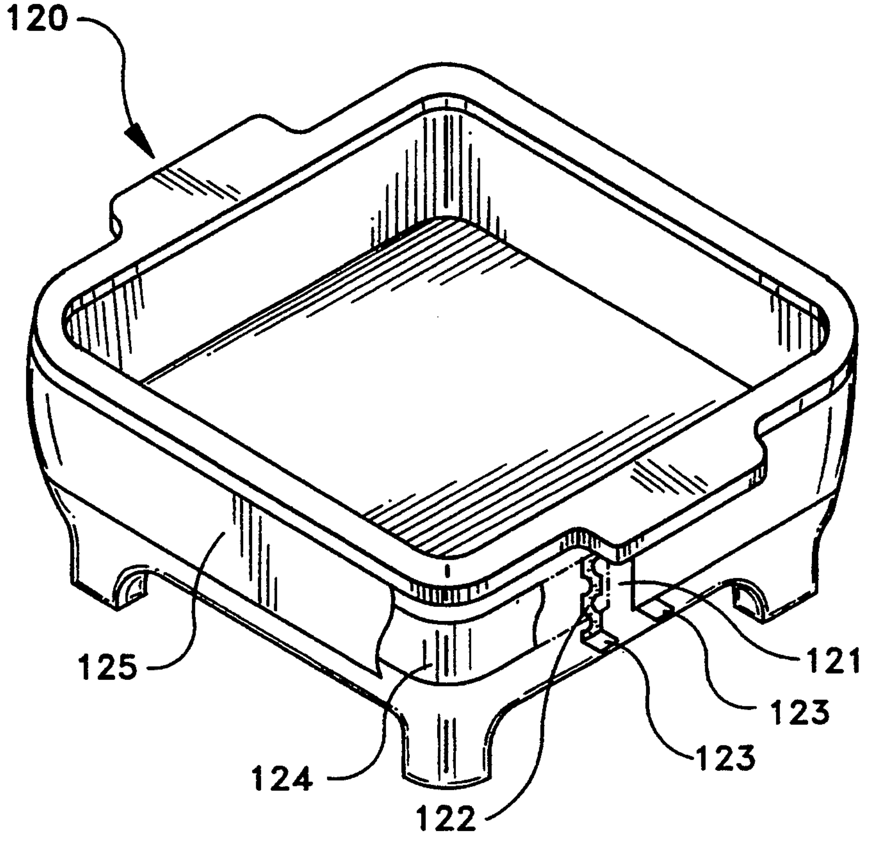
FIG. 9 is a perspective view of a cookware article upon which an HTCR coating of the invention has been applied.

In the embodiment depicted in FIG. 9, a cookware article 120 is shown with an application of the HTCR coating 124 of the invention. As in the embodiment shown in FIG. 7 and as described above, perforated serpentine-shaped conductive strips 122 in the form of spaced-apart parallel electrical conductors are attached to the cookware surface 121. The length of perforated serpentine-shaped conductive strips 122, that length being some portion of the depth of the cookware article, determines the conducting coated surface area and therefore the heating capacity of the cookware article. The outer cookware surface 121 and perforated serpentine-shaped conductive strips 122 are then HTCR coated. Once dried, the HTCR coating 124, covering the cookware surface 121 and the perforated serpentine-shaped conductive strips 122 is covered with a silica-clay non-conductive coat 125. This prevents short circuiting of the voltage applied across the coating 124 applied to cookware surface 121 with objects coming into contact with it.

Perforated serpentine-shaped conductive strips 122 are separated by a small non-conducting non-coated section of cookware surface 121. Accordingly, voltage applied to the strips creates a voltage potential across the larger HTCR coated cookware surface 124 between the strips 122. That is, a voltage provided across almost the entire circumferential surface of the cookware article.

In addition, conductive strips 122 are perforated and serpentine shaped in order to provide a larger surface area in conducting contact with the HTCR coating 124. The perforation and serpentine shaping are also provided to prevent fracturing and separation of the electrical conductors (conductive strips 122) from the HTCR coating as the materials expand and contract with changing temperatures. Perforated serpentine-shaped conductive strips 122 are also formed with connector tab portions 123 (not shown) which allow for electrical contact by a plug-in connector. It must be noted that cookware of this embodiment is not limited to the heating and preparation of food. It may be used to keep anything within a high temperature range of from ambient to 1200° F.

Although most references to spaced-apart electrical conductors have been described as perforated serpentine-shaped conductive strips, the invention is not limited thereto. Non-perforated or non-serpentine-shaped conductive strips may be used as spaced-apart electrical conductors for applying current to the HTCR coating of the invention without changing the nature of the invention.

Figure 9A:
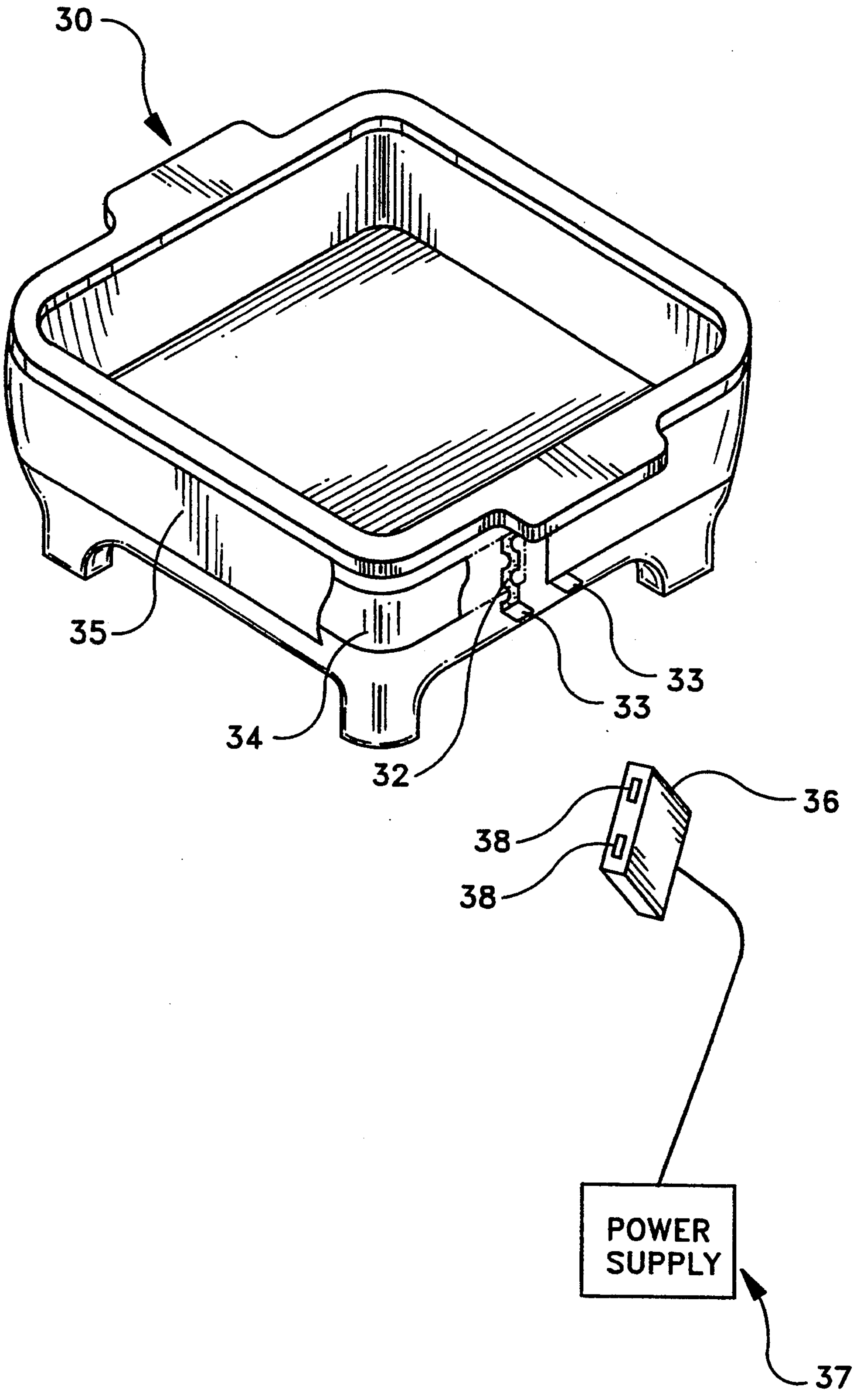
FIG. 9A is a perspective view of a cookware article, an electrical power supply and a removably detachable electrical connector.

FIG. 9A depicts a cookware article 30 having an HTCR coating 34 of the invention to which a power supply 37 is attached. The figure shows a power supply 37 connected to perforated serpentine-shaped conductive strips 32 through electrical conductors 36. A silica-clay non-conductive coating 35 is applied to cover the HTCR coating 34 and strips 32 as in the embodiment described above with reference to FIG. 9. Connector tabs 33 are formed as part of perforated serpentine-shaped conductive strips 32 and are insertable into a receptacle portion 38 of connector 36. Power supply 37 may be any conventional power supply or electrical storage cell.

Figure 10:
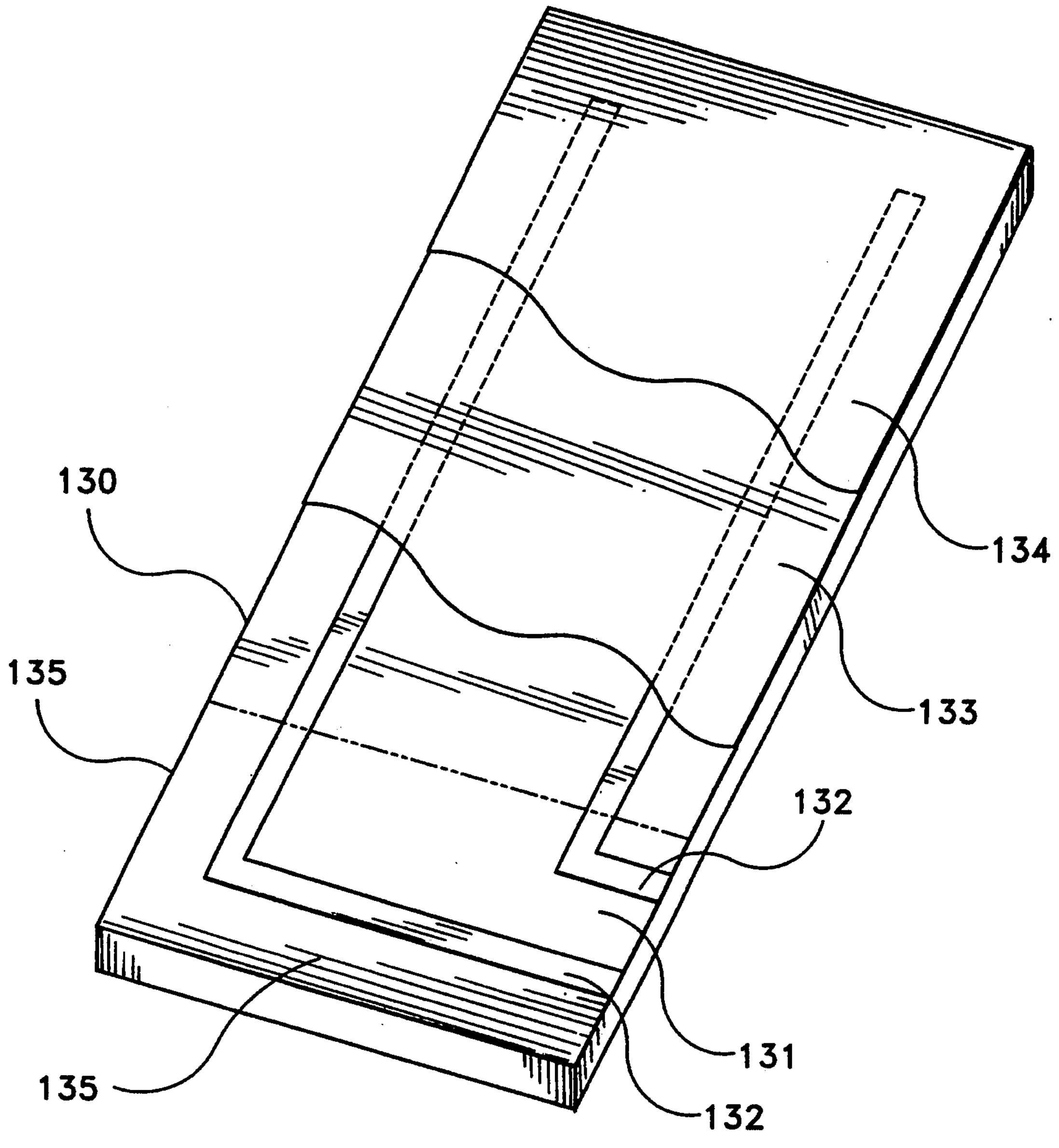
FIG. 10 is a top perspective view of a panel upon which an HTCR coating of the invention has been applied.

In the embodiment depicted in FIG. 10, a rigid fiberglass panel 130 is shown with an HTCR coating of the invention applied. One of the benefits of using a fiberglass panel as a substrate is that it can be formed in any thickness or shape required for a particular application. As shown in FIG. 10, two conductive strips 132 are adhered to or plated into the substrate surface 131. The conductive strips 132 extend from the edge of the substrate along its width in a non-coated portion of the substrate surface 135. The path of conductive strips 132 then turns 90° extending along the length of the substrate surface 13 on opposite sides. The fiberglass panel 130 and the portion of conductive strips 132 extending along the length of the substrate surface 131 are then HTCR coated. When dry, the HTCR coated surface 133 is further coated with a non-conductive paint or plastic sheet of sound insulating foam 134. This insulating coating 134 prevents short circuiting of the voltage applied to the HTCR coated surface 133 by objects coming into contact with the panel 130.

Figure 11:
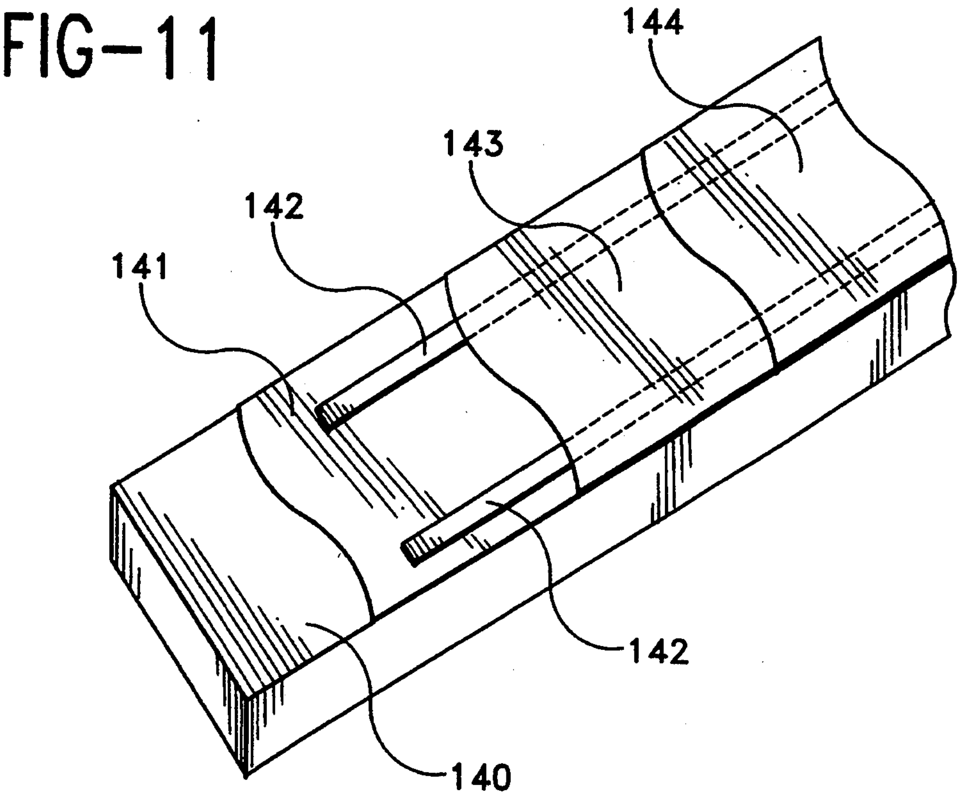
FIG. 11 is a perspective view of a wood or a wood-like material upon which an HTCR coating of the invention has been applied.

The embodiment depicted in FIG. 11 shows a wood substrate 140 with an HTCR coating 143 of the invention. The wood substrate 140 is first coated with a non-conductive coat of silica-clay material as a base, forming non-conductive surface 141. Conductive strips 142 are then attached to the non-conductive coated surface 141. When dry, an HTCR coating 143 is applied to the non-conductive surface 141 and conductive strips 142. A non-conductive high-temperature color paint or plastic sheet of sound insulation foam 144 is then applied to all conducting surfaces to assure electrical isolation.

Figure 12:
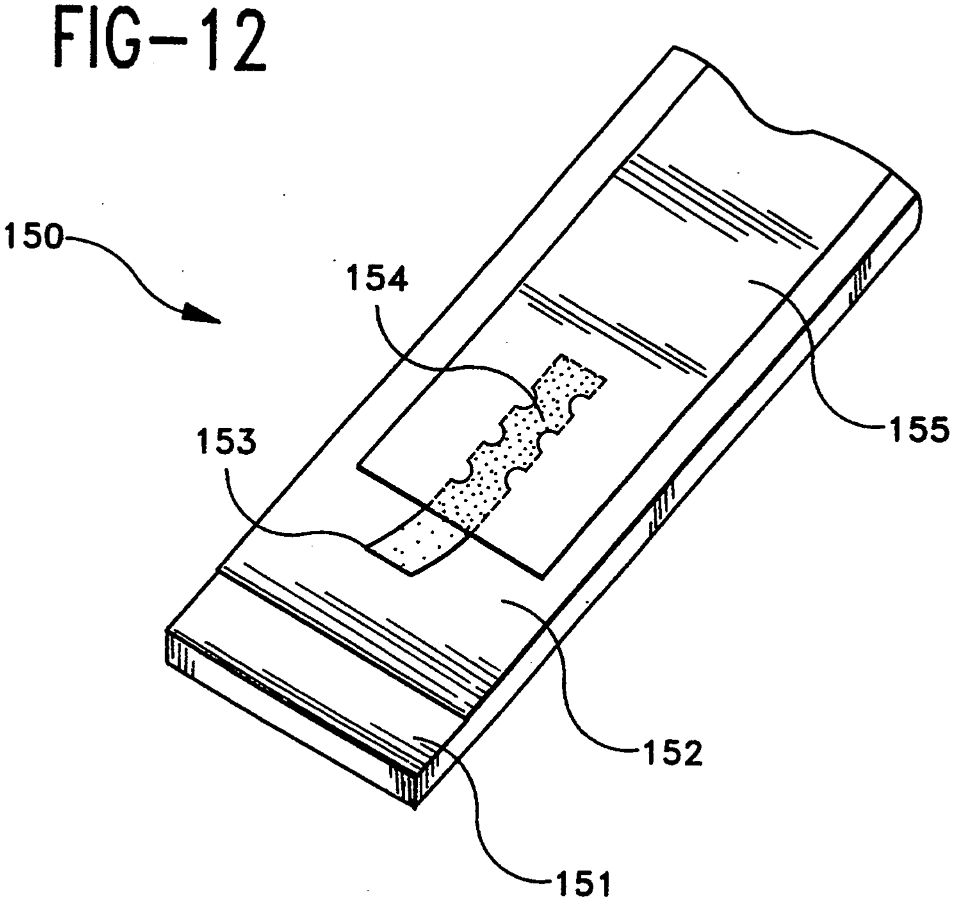
FIG. 12 is a thin metal plate or strip upon which an HTCR coating of the invention has been applied.

An alternative embodiment of the invention is shown in FIG. 12. There, an anodized aluminum strip 150 is shown with an HTCR coating of the present invention. A substrate surface 151 of aluminum strip 150 is first coated with a iron oxide-sodium silicate adhesive to form a non-conductive base 152. This process essentially anodizes the substrate surface 151. Upon non-conductive base 152 is then secured a thin metal perforated serpentine-shaped conductive strip 154. The conductive strip extends only as far into the length of anodized aluminum strip 150 sufficient to provide good electrical contact with the HTCR coating. The entire surface is then HTCR coated 155 in whole or in part, embedding the perforated serpentine-shaped conductive strip 154. A thin connector tab 153 is formed at the end of the conductive strip for easy electrical attachment of an electrical power source (not shown).

A second perforated serpentine-shaped conductive strip 154 (not shown) is disposed in a similar manner on an opposite end (not shown) of the anodized aluminum strip 150 and embedded in HTCR coating 155. By applying a voltage across these conductive strips, current flows through the HTCR coating thereby heating the anodized aluminum strip 150. HTCR coated aluminum strips 150 prepared in this manner may be heated to temperatures within a temperature range of from ambient up to 1200° F. It should be noted that the present embodiment is not limited to an aluminum anodized material. Any conductive metal such as dielectric coated copper, silver, stainless steel, etc., may be used in place of aluminum.

Figure 13A:
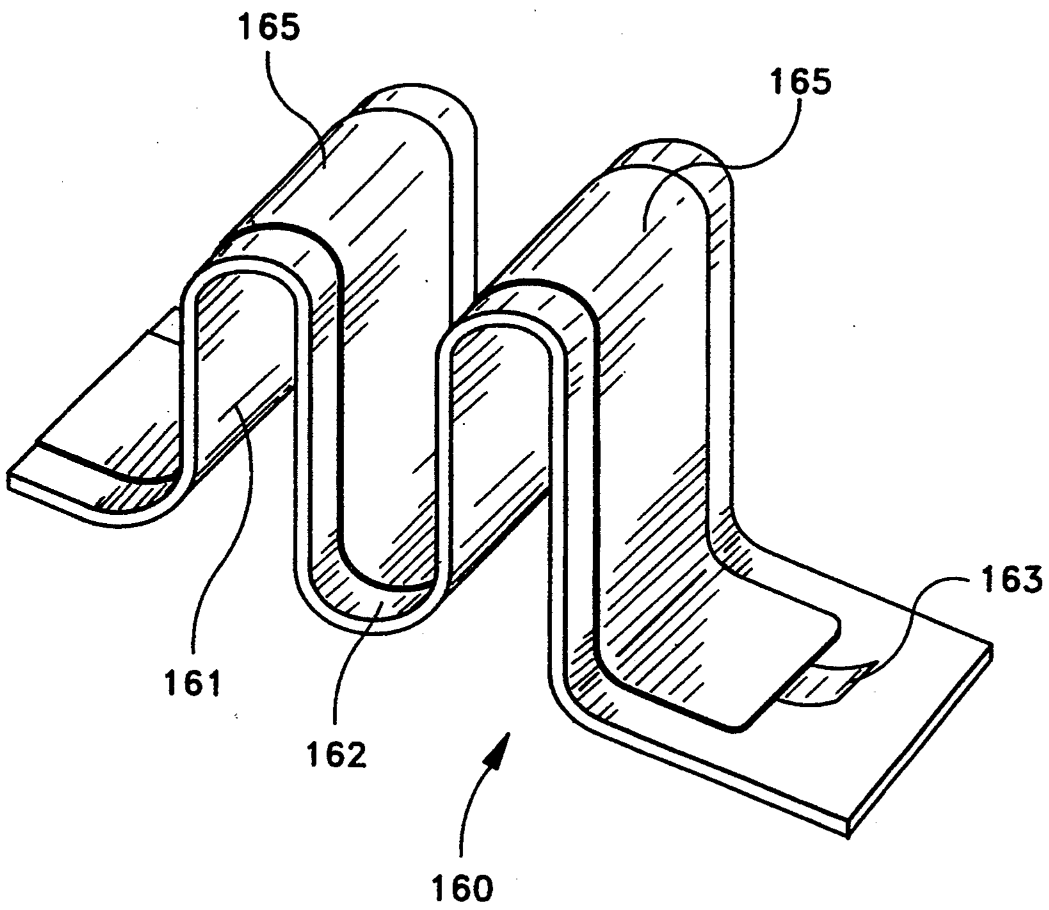
FIGS. 13A and 13B show variations of the embodiment of the invention depicted in FIG. 12.
Figure 13B:
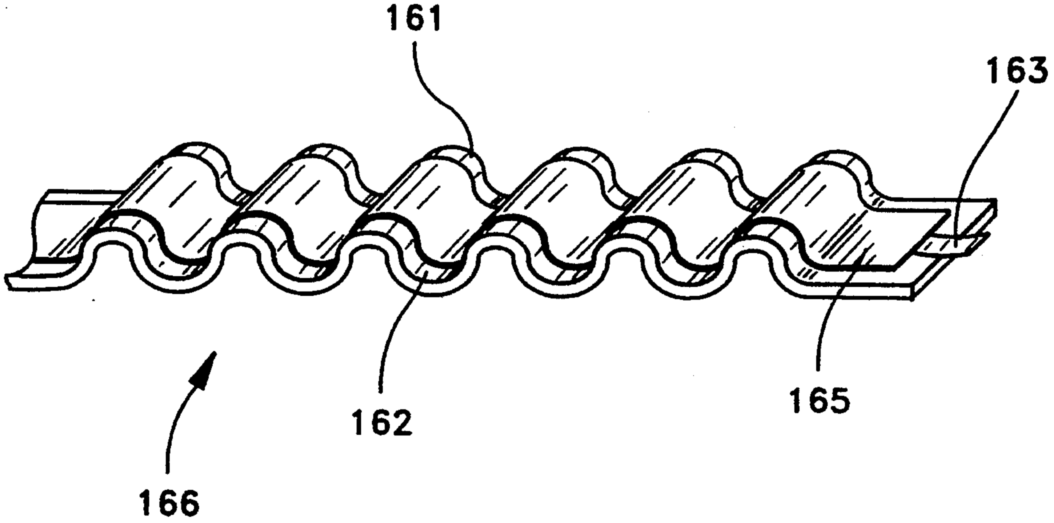

FIGS. 13A and 13B show variations of the embodiment of the invention depicted in FIG. 12 and as discussed above. An anodized aluminum strip is shown in a ribbed shape 160 in FIG. 13A and in a flat ribbed shape 166 in FIG. 13B.

Upon the surface 161 of the strips 160, 166 is applied a coat of iron oxide-sodium silicate adhesive forming a non-conductive base 162. A thin-metal connector tab 163 is formed at an end of a thin-metal perforated serpentine-shaped conductive strip (not shown) embedded part way into the length of the HTCR coating 165 and disposed on the non-conductive base 162. A second thin-metal connector tab 163 (not shown) is disposed at an opposite end of the anodized strips 160, 166 shown in the figures. The particular shapes of FIGS. 13A and 13B provide for increased surface area in a decreased volume. Therefore, more concentrated heat radiation is available than that of the embodiment depicted in FIG. 12 and described above.

Figure 14:
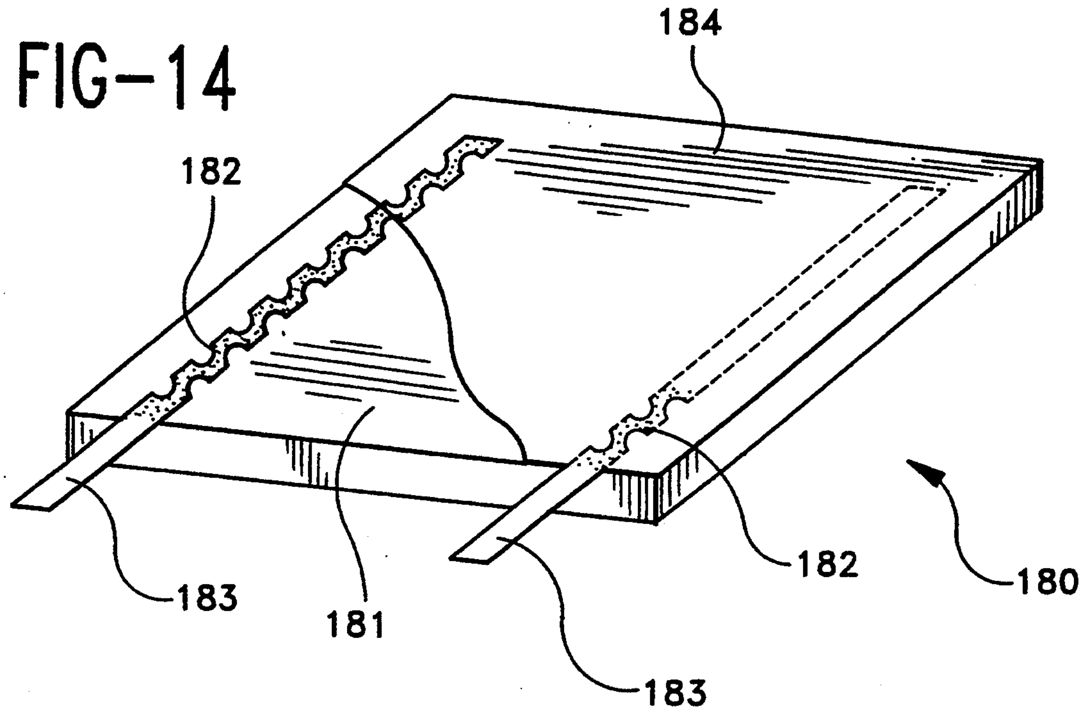
FIG. 14 is a top perspective view of a section of glass or ceramic material upon which an HTCR coating of the invention has been applied.

In yet another embodiment, FIG. 14 shows a substrate made of glass or some type of ceramic-based material 180 upon which an HTCR coating of the invention is applied. Upon a substrate surface 181 are disposed a pair of perforated serpentine-shaped conductive strips 182. The conductive strips lie parallel to each other and extend along the edges of the substrate surface 181. On both the substrate surface 181 and the perforated serpentine-shaped conductive strips 182 is applied an HTCR coating 184. Connector tabs 183, formed at the ends of the conductive strips, are used to connect power to the perforated serpentine-shaped conductive strips 182 contacting the HTCR coating 184.

Figure 15:
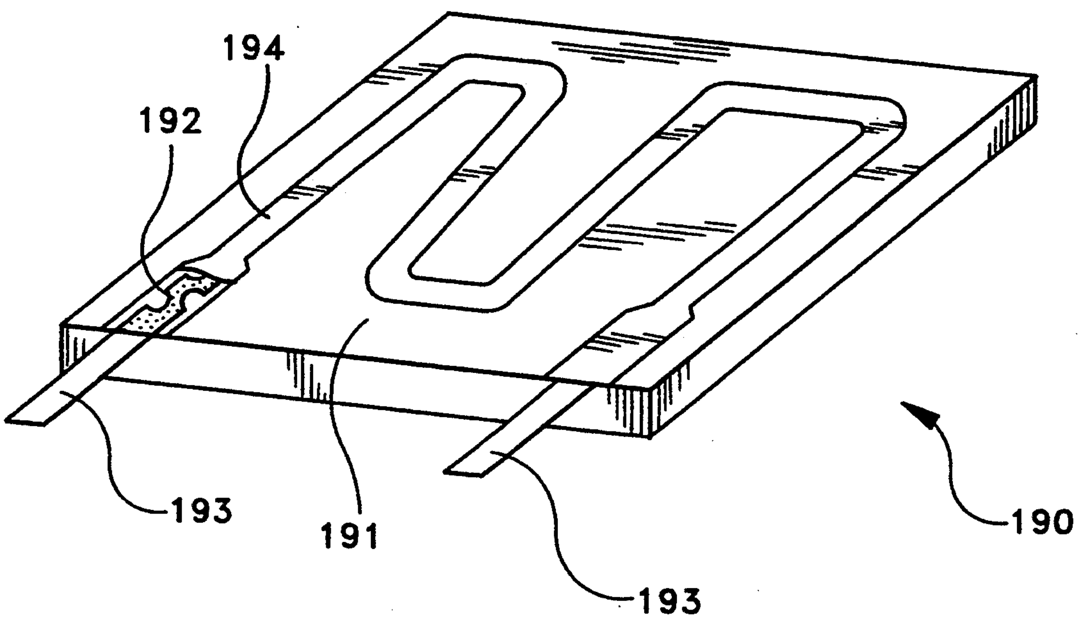
FIG. 15 is a top perspective view of a section of glass or ceramic material upon which an HTCR coating of the invention has been applied in a predetermined pattern or shape.

FIG. 15 shows yet another embodiment of the HTCR coating of the invention. There, an HTCR coating is shown applied to a section of glass or ceramic material 190 in a limited amount defining predetermined pattern or shape. As shown in the figure, perforated serpentine-shaped conductive strips 192 having connector tabs 193 are placed along the edges of the substrate surface 191. The conductive strips extend only part way into the length of the surface 191 upon which they are attached. The perforated serpentine-shaped conductive strips 192 extend only far enough to provide sufficient electrical contact with the limited HTCR pattern 194 applied to the substrate surface 191. The novelty of such an implementation resides in the ability of the user to apply the HTCR coat 194 discriminately to only those areas of an article which require heating.

Figure 16:
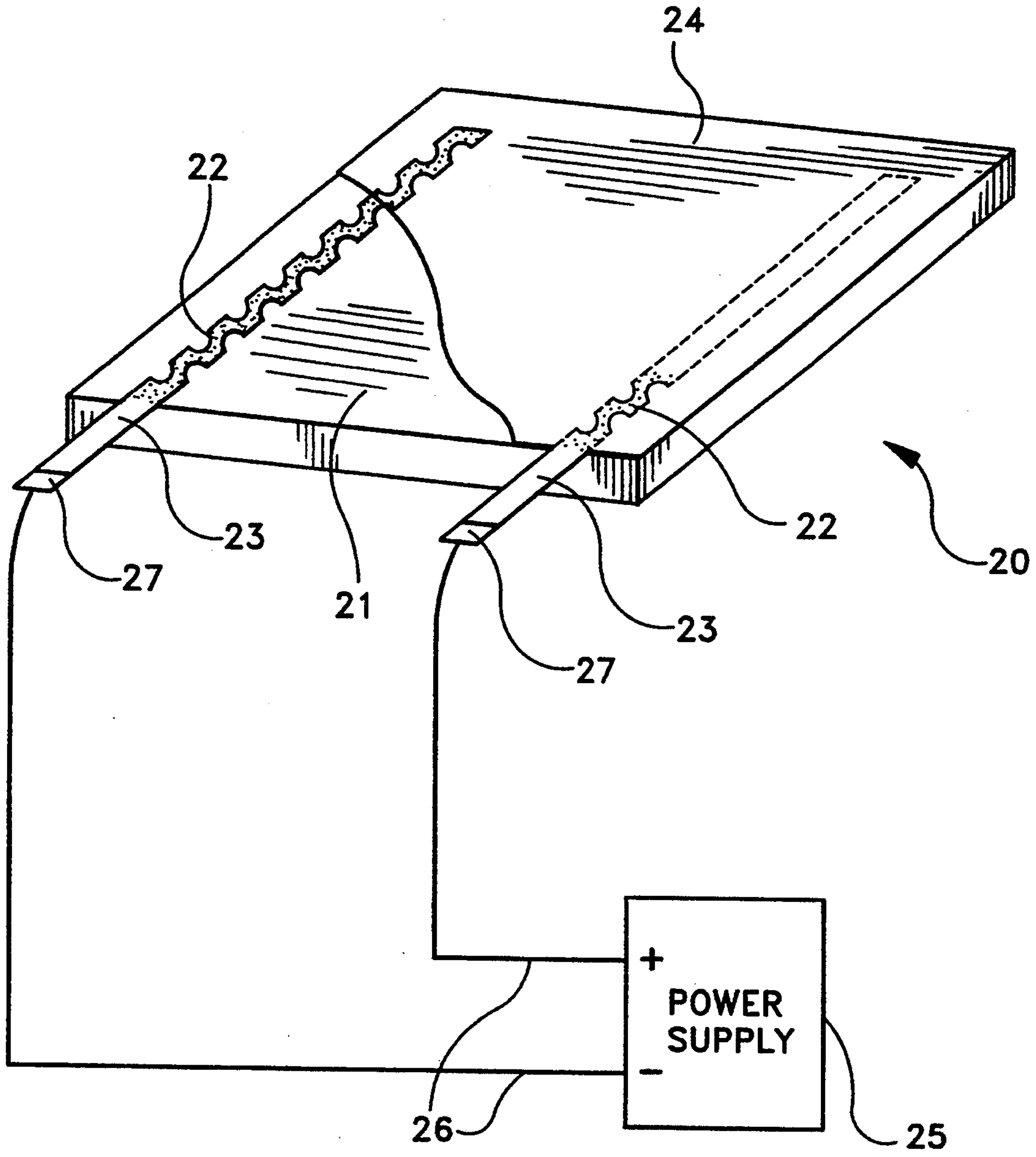
FIG. 16 is a top perspective view of a section of glass or ceramic material of the invention to which an electrical power supply has been attached.

FIG. 16 depicts a glass or ceramic-based material 20 in which the substrate surface 21 is shown with an HTCR coating 24 of the invention to which a power supply 25 is attached. The power supply is connected to perforated serpentine-shaped conductive strips 22 through the use of a pair of electrical leads 26 and a pair of lead connectors 27. Lead connectors 27 attach directly to connector tabs 23 of perforated serpentine-shaped conductive strips 22. Power supply 25 may be any conventional power supply or electrical storage cell.

Figure 17:
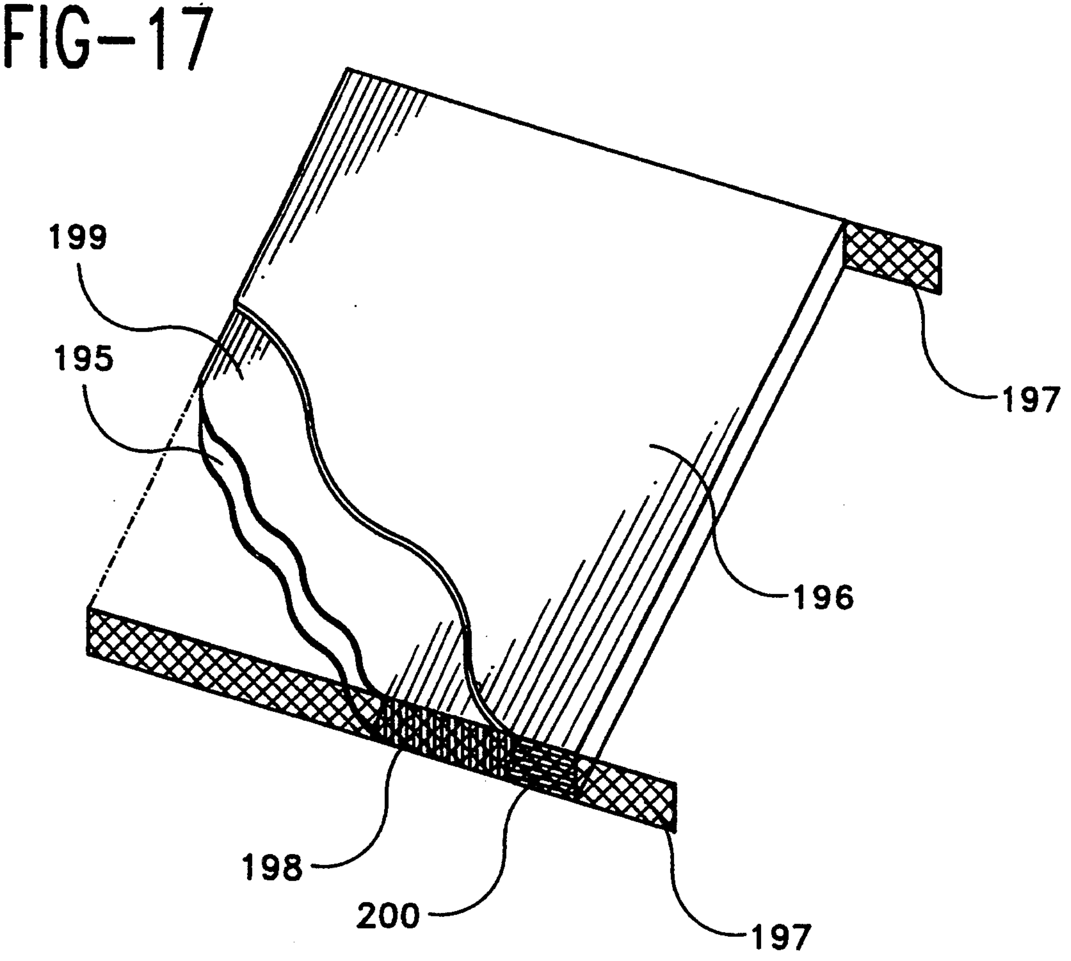
FIG. 17 is a perspective view of a shape made from the HTCR material clay consistency with minimum water, without a substrate, glazed and fired at 2000° F. having perforated serpentine-shaped conductive strips attached with conductive adhesives to ground HTCR exposed ends.

FIG. 17 depicts a ceramic plate formed with an HTCR material of the invention. The HTCR material forming the plate is made with minimum water, producing an HTCR composite having a clay consistency. The plate is dried and when the water content is diminished, the plate is kiln fired at around 2500° F. in a table salt atmosphere (NaCl). At approximately 2500° F., the HTCR material forms a thin non-conductive coating 199 and an oxygen barrier coating 196 from the vaporized salt, encompassing the inner HTCR material 195 as a structurally strong semi-conductive source. The plate is ground on 2 ends to expose the HTCR material 195 and then perforated or mesh conductors of stainless steel 197 are adhered with a mixture of graphite/sodium silicate, 198 to the HTCR material 195. After hardening, conductors 197 and the HTCR material 198 is coated with a non-conductive oxygen barrier coating 200 of iron oxide/sodium silicate. When current is applied between conductors 197, the ceramic plate made of the HTCR composite radiates heat from ambient temperature to over 2000° F.

Figure 17A:
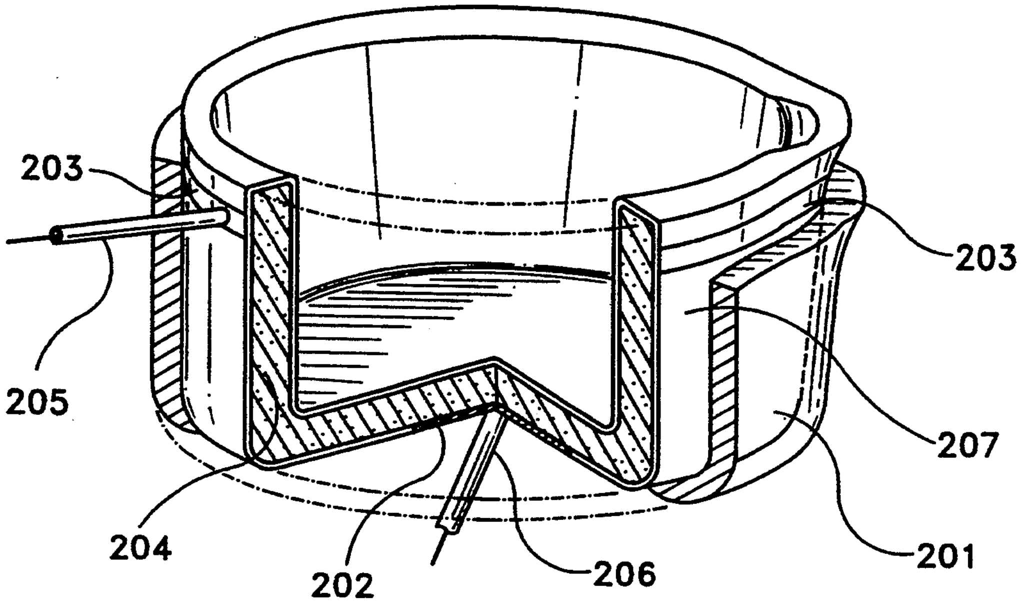
FIG. 17A is a perspective of a high temperature crucible (over 2000° F.) formed from HTCR material, as in FIG. 17, with the conductive material glazed on the HTCR material.

FIG. 17A depicts a high temperature crucible for melting aluminum, copper, silver, gold and other metals in the 2000° F. temperature range. A crucible shape is formed from the above-described HTCR clay consistency mixture, dried and glazed coated with a conductive material, such as tungsten carbide, shown in ring 203 and pad 202. A non-conductive glaze 207 is applied in any manner available in the prior art to cover the remainder of the HTCR crucible shape. The crucible is kiln fired at 2500° F. to 3000° F. to set the HTCR clay consistency mixture 204. Wires 205 and 206 are spot welded to the conductive glaze ring 203 and conductive glaze pad 202 to complete the conductive resistant heating circuit through the HTCR mixture 204. A high temperature insulation 201 of diatomaceous earth is coated to prevent heat loss dissipation. When sufficient electrical current is applied to wires 206 and 205, through conductive ring 203 and conductive pad 202, the resistance through HTCR material 204 radiates a temperature over 2000° F. The basic materials of this crucible construction can withstand temperatures of over 4000° F.

Although illustrative embodiments of the present invention have been described herein with reference to the accompanying drawings, it is to be understood that the invention is not limited to the precise embodiment, and that various other changes and modifications may be effected therein by one skilled in the art without departing from the scope or spirit of the invention.

What is claimed:

1. A high-temperature article, which comprises:

a first substrate comprised of a high temperature material; and a continuous high-temperature conductive-resistive coating lastingly adhered to said first substrate, said coating including a non-conductive binder and an electrically-conductive component to provide a continuous electrically-resistive path for application of electrical current through said coating, the integrity of said path and said lasting adhesion maintained within a range of from about 400° F. to about 2000° F.;

whereby surface temperature of said coating along said path is adjustable in response to electric current applied thereto at a temperature range of from about 400° F. to about 2000° F. without deterioration due to oxidation of the conductive-resistive coating.

2. The high-temperature article as defined by claim 1, wherein said first substrate is flexible.

3. The high-temperature article as defined by claim 1, wherein said first substrate is rigid.

4. The high-temperature article as defined by claim 1, wherein said first substrate is hydrophilic in nature.

5. The high-temperature article as defined by claim 1, wherein said first substrate is treated with a hydrophilic substance before the conductive-resistive coating is applied to enhance the bonding of said coating to said first substrate.

6. The high-temperature article as defined by claim 1, further comprising spaced-apart electrical conductors lastingly adhered to said article by said coating thereby establishing electrical conductivity with said coating and defining said path on said article.

7. The high-temperature article as defined by claim 6, wherein said spaced apart electrical conductors are perforated providing an increased electrically contacting surface area by said coating.

8. The high-temperature article as defined by claim 6, wherein said spaced-apart electrical conductors are serpentine shaped.

9. The high-temperature article as defined by claim 6, further comprising a power source coupled to said electrical conductors.

10. The high-temperature article as defined by claim 9, wherein the power source is a battery.

11. The high-temperature article as defined by claim 6, further comprising a second, complementary substrate disposed substantially coextensive with and in parallel relation to said first substrate whereby said electrical conduction and said coating are between said first substrate and said second substrate.

12. The high-temperature article as defined by claim 11, wherein said second substrate comprises the same material as said first substrate.

13. The high-temperature article as defined by claim 1, wherein said high temperature conductive-resistive coating comprises an electrically conductive particulate suspended in a substantially non-conductive binder whereby a conductivity and resistivity of said path is controlled thereby controlling the temperature of said article.

14. The high-temperature article as defined by claim 13, wherein said electrically-conductive particulate is selected from the group consisting of graphite, carbon, tungsten carbide, and said binder is selected from the group consisting of alkali-silicate compounds, clay, silica, silicon carbide, iron oxide, and high-temperature, conductive adhesives that are capable of maintaining the integrity of a bond formed therewith at temperatures between about 400° and about 2000° F.

15. The high-temperature article as defined by claim 14, wherein said alkali-silicate compounds comprise up to about 14% china clay, up to about 38% sodium silicate, between about 4 and about 10% graphite and up to about 10% iron oxide.

16. The high-temperature article as defined by claim 15, wherein the amount of graphite in said alkali-silicate compound is varied by replacing some portion thereof with iron oxide in order to increase the resistive range of the high-temperature conductive-resistive coating.

17. The high-temperature article as defined by claim 5, wherein said hydrophilic substance comprises polyvinylpyrrolidone.

18. The high-temperature article as defined by claim 2, wherein said flexible first substrate is selected from the group consisting of fireproof paper, fiberglass cloth, flexible silica heating cloth, and flexible metal dielectric coated tape.

19. The high-temperature article as defined by claim 3, wherein said rigid first substrate is selected from the group consisting of rigid fiberglass panels, glass, ceramic, anodize aluminum, dielectric coated copper strips, wood, concrete-formed articles, brick and clay-formed materials.

* * * * *